United States Patent
Doemens et al.

(10) Patent No.: US 7,701,557 B2
(45) Date of Patent: Apr. 20, 2010

(54) DEVICE FOR MONITORING SPATIAL AREAS

(75) Inventors: Günter Doemens, Holzkirchen (DE); Peter Mengel, Eichenau (DE); Michael Stockmann, Bruckmühl (DE)

(73) Assignee: Siemens Aktiengesellschaft, Munich (DE)

( * ) Notice: Subject to any disclaimer, the term of this patent is extended or adjusted under 35 U.S.C. 154(b) by 166 days.

(21) Appl. No.: 11/729,119

(22) Filed: Mar. 28, 2007

(65) Prior Publication Data

US 2007/0181786 A1 Aug. 9, 2007

Related U.S. Application Data

(63) Continuation of application No. PCT/EP2005/054862, filed on Sep. 28, 2005.

(30) Foreign Application Priority Data

Sep. 28, 2004 (DE) .................. 10 2004 047 022

(51) Int. Cl.
*G01C 3/08* (2006.01)
(52) U.S. Cl. ..................................... 356/5.01
(58) Field of Classification Search ........ 356/3.01–28.5
See application file for complete search history.

(56) References Cited

U.S. PATENT DOCUMENTS

| 3,781,111 A | 12/1973 | Fletcher et al. |
| 5,210,586 A | 5/1993 | Grage et al. |
| 5,539,199 A | 7/1996 | Ruckh et al. |
| 5,682,229 A | 10/1997 | Wangler |
| 5,784,023 A | 7/1998 | Bluege |
| 6,031,601 A * | 2/2000 | McCusker et al. ......... 356/5.01 |
| 6,636,300 B2 | 10/2003 | Doemens et al. |
| 6,856,919 B1 | 2/2005 | Bastian et al. |
| 7,274,438 B2 * | 9/2007 | Doemens et al. ........... 356/5.04 |
| 2002/0003617 A1 * | 1/2002 | Doemens et al. ........... 356/4.01 |
| 2005/0078297 A1 | 4/2005 | Doemens et al. |
| 2005/0088644 A1 * | 4/2005 | Morcom ...................... 356/10 |

FOREIGN PATENT DOCUMENTS

| DE | 37 41 195 A1 | 2/1989 |
| DE | 44 05 376 C1 | 2/1995 |
| DE | 199 10 667 A1 | 9/2000 |
| DE | 101 56 282 A1 | 6/2003 |
| DE | 101 63 534 A1 | 10/2003 |
| DE | 103 13 194 A1 | 10/2004 |
| EP | 0 464 263 A2 | 1/1992 |
| EP | 0 526 424 A2 | 2/1993 |
| EP | 1 312 936 A2 | 5/2003 |
| GB | 2381684 A | 7/2003 |
| WO | WO 00/55642 | 9/2000 |

* cited by examiner

*Primary Examiner*—Thomas H Tarcza
*Assistant Examiner*—Luke D Ratcliffe
(74) *Attorney, Agent, or Firm*—Laurence A. Greenberg; Werner H. Stemer; Ralph E. Locher

(57) ABSTRACT

A monitoring device for spatial areas comprises a receiver, to which an anamorphotic optical system, is assigned. The monitoring device also has a transmitter which scans a field of view assigned to the receiver using radiation pulse beams. A distance image of an object in the field of view can be produced by way of a radiation transit time determination with short-term integration carried out in an evaluation unit.

15 Claims, 4 Drawing Sheets

DEVICE FOR MONITORING SPATIAL AREAS

CROSS-REFERENCE TO RELATED APPLICATIONS

This is a continuation, under 35 U.S.C. §120, of copending international application No. PCT/EP2005/054862, filed Sep. 28, 2005, which designated the United States; this application also claims the priority, under 35 U.S.C. §119, of German patent application DE 10 2004 047 022.7, filed Sep. 28, 2004; the prior applications are herewith incorporated by reference in their entirety.

BACKGROUND OF THE INVENTION

Field of the Invention

The invention relates to a device for monitoring spatial areas having a transmitter emitting radiation pulses and a receiver, to which a field of view is assigned by way of an optical system arranged in front of the receiver in the radiation path and which receives the radiation pulses emitted by the transmitter into the field of view, as well as having an evaluation unit connected to the receiver and the transmitter, said evaluation unit serving to determine the transit time of the radiation pulses.

A device of the type is described in our commonly assigned German published patent application DE 101 63 534 A1 and its corresponding U.S. patent publication US 2005/0078297 A1. That device, referred to as a device for monitoring spatial areas, comprises transmitters, which emit radiation pulses. The latter are reflected by objects in the spatial areas to be monitored back to receivers. The receivers are connected to a transit time determination unit, with the aid of which a distance image of an object in the space can be produced. The evaluation unit evaluates the distance images and produces a detection signal at one output, if predetermined distance values occur in the distance images.

The prior device for monitoring spatial areas is particularly suited to installing light curtains. Light barriers are then not necessary. As the receivers can be integrated into a semiconductor chip as a line of sensors, it is possible to mount light curtains from approximately one individual point in the room, the light curtains extending across several meters. The assembly of the earlier device for monitoring spatial areas is accordingly cost-effective, as only one installation is necessary at one individual location.

As the prior device for monitoring spatial areas not only determines the presence of an object in the space to be monitored but also provides information relating to the distance of objects which are located in the light curtain, the false alarm rate can be significantly reduced, since interference influences resulting from contamination and foreign particles, insects or external light for instance, can be effectively suppressed.

SUMMARY OF THE INVENTION

It is accordingly an object of the invention to provide a device for monitoring a space which overcomes the above-mentioned disadvantages of the heretofore-known devices and methods of this general type and which enables monitoring of complex spatial areas.

With the foregoing and other objects in view there is provided, in accordance with the invention, a device for monitoring a space, comprising:

a transmitter emitting light with temporal intensity changes, a receiver having one-dimensional resolution, and an optical system, for assigning to the receiver a field of view, disposed in a radiation path in front of said receiver;

the receiver receiving radiation pulses emitted by the transmitter into the field of view;

an evaluation unit connected to the receiver and to the transmitter, the evaluation unit serving to determine a transit time of the radiation pulses;

the transmitter subjecting the field of view to radiation pulse beams partially covering the field of view, and the evaluation unit receiving information concerning a shape of the radiation pulse beams in the field of view during determination of the transit time of the radiation pulse beams; and an anamorphotic optical system disposed to compress the field of view onto the receiver.

In other words, the device for monitoring spatial areas comprises a receiver, to which a field of view is assigned by way of an optical system. Furthermore, the device has a transmitter, which illuminates the field of view with radiation pulse beams, which only partially cover the field of view in a specific form in each instance. The field of view is thus illuminated with the aid of the radiation pulse beams, with information relating to the direction of the respective radiation pulse beam being made available to the evaluation unit during determination of the transit time of the radiation pulse beams, so that a distance image of a detected object can be reconstructed from the measured distance values.

A pulsed beam or a beam modulated in any other manner is understood here in this context as a radiation pulse beam, said beam only covering a part of the field of view, in particular less than three quarters, preferably less than half of the field of view.

As the direction of the radiation pulse beams within the field of view can be selected almost arbitrarily, light curtains with a complex geometry can be produced using the device for monitoring spatial areas.

In particular, it is also possible to design light curtains arranged one behind the other using the device for monitoring spatial areas, with which light curtains information relating to the direction and the speed of movement of the objects can be obtained. Since the direction of the radiation pulse beams can also be changed with minimal technical outlay even after the device has been installed, the light curtains can be adapted to the respective situation in a flexible manner.

It is also advantageous that only one segment of the field of view is subjected to radiation. In comparison with the prior art, wherein the entire field of view of the receiver is illuminated, a transmitter with minimal radiation power can thus be selected.

It is furthermore advantageous that no complex receivers are required for the device for monitoring spatial areas. A receiver having an individual sensor element is basically sufficient for the device for monitoring spatial areas. The information volume supplied by the device can however be increased by using complex receivers, for instance by using a line of sensors.

A preferred embodiment comprises a field of view, which is subdivided into a plurality of field of view segments, each assigned to a sensor element of the receiver. The radiation pulse beams detected in the individual field of view segments can be recorded and processed in a parallel manner by the individual sensor elements of the receiver. This embodiment is therefore wherein by a particularly high time resolution.

With a further preferred embodiment, the individual field of view segments are sequentially subjected to radiation pulse beam at different locations. This embodiment allows a spatial volume to be systematically scanned with high local resolution.

In addition, it is also possible to subject the individual field of view segments simultaneously to radiation pulse beams which are offset in relation to each other. With this embodiment, the local resolution is low but this means that changes in the object to be detected can be detected at short time intervals.

The receiver is a line of sensors having a plurality of sensor elements arranged next to one another, to which sensor elements field of view strips which lie next to one another in the field of view in each instance are assigned. These field of view strips do not necessarily need to be rectangular, but can inter alia also be wedge-shaped or ring-shaped. The advantage here is that the signal-to-noise ratio is favorable, since each sensor element only receives the radiation incident in the respective field of view strips, so that the background noise remains low.

Depending on the embodiment, the field of view strips can be subjected sequentially to differently aligned radiation pulse beams, which extend over the field of view strips, or can be subjected simultaneously to a plurality of different radiation pulse beams arranged in an offset manner in the individual field of view strips.

Embodiments of this type allow changes in an object located in the field of view to be detected at short time intervals and are thus suited to collision protection systems in driverless transportation vehicles.

Furthermore, these embodiments are also suited to the prompt detection of accident situations in the case of vehicles occupied by drivers and thus enable countermeasures to be taken in good time.

Other features which are considered as characteristic for the invention are set forth in the appended claims.

Although the invention is illustrated and described herein as embodied in device for monitoring spatial areas, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
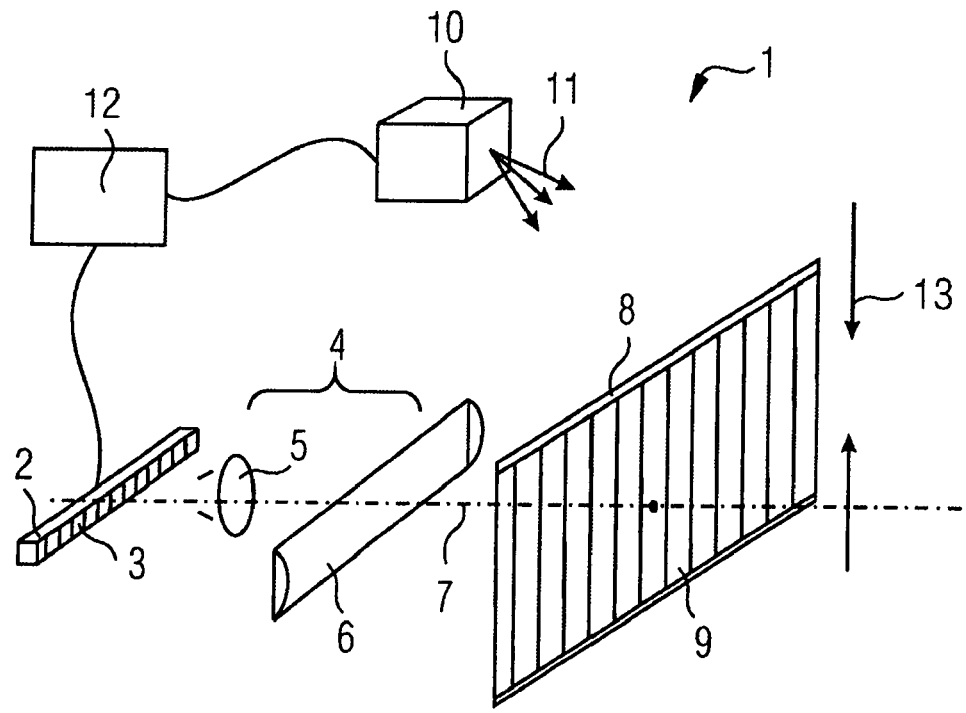
FIG. 1 is a diagrammatic, perspective view of the structure of a monitoring device.

Referring now to the figures of the drawing in detail and first, particularly, to FIG. 1 thereof, there is shown a monitoring device 1 for monitoring a space, also referred to herein as a spatial area or spatial region.

The monitoring device 1 has a receiver 2, which comprises a plurality of sensor elements 3 which are arranged next to one another and can thus have one-dimensional resolution. An optical system 4 is arranged in front of the sensor elements 3, said optical system 4 being indicated in FIG. 1 by a convex lens 5 and a cylindrical lens 6. The optical system 4 defines an optical axis 7 and a field of view 8. The subdivision of the receiver 2 into independent sensor elements 3 corresponds to the subdivision of the field of view 8 into field of view strips 9. The field of view strips 9 are the sensor elements 3 transformed in each instance by the optical system 4 to the receiver. As the optical system 4 is an anamorphotic optical system, the extended field of view strips 9 correspond to the square sensor elements 3 for instance.

The monitoring device 1 also has a transmitter 10, which emits radiation pulse beams 11 in a manner described in more detail below. Both the receiver 2 and also the transmitter 10 are connected to an evaluation unit 12.

During operation of the monitoring device 1, the transmitter 10 emits the radiation pulse beams 11 into the field of view 8. The radiation pulse beams 11 are reflected there by an object (not shown in FIG. 1) back in the direction of the optical axis 7 to the receiver 2 and are detected there. The output signal supplied by the receiver 2 is evaluated by the evaluation unit 12. In this process, the evaluation unit 12 carries out a transit time determination.

Generally speaking the transit time determination is carried out as follows: After the transmitter 10 has emitted a radiation pulse beam 11, the evaluation unit 12 triggers the sensor elements 3 in the receiver 2 to become active. The sensor elements 3 each comprise a photodiode, which discharges a pixel capacitor assigned to the respective sensor element 3. After a predetermined time interval, the sensor element 3 is deactivated. The residual charge remaining in the pixel capacitor is then a measure of the light quantity or radiation energy detected by the photodiode. As the light quantity detected by the photodiode depends on the light quantity reaching the photodiode within the time during which the photodiode is activated, the residual charge remaining in the pixel capacitor is a measure of the transit time T of the radiation pulse beam 11 from the transmitter 10 to the object and back to the sensor element 3. The distance of the object d then approximately results from the formula $d = c \cdot T/2$.

The transit time determination outlined here is known to the person skilled in the art by the term light transit time measurement with short-term integration. The receivers required for this purpose are usually implemented in CMOS technology.

The particular features of the monitoring device 1 are described in detail below. The radiation pulse beam 11 striking a field of view strip 9 can be reflected by the object reflecting the radiation pulse beam 11 back to the sensor element 3, which is assigned to the respective field of view strip 9. This takes place irrespective of where the radiation pulse beam 11 strikes the object along the field of view strip 9. This means that a change in the direction of the radiation pulse beam 11 allows the object to be scanned along a field of view strip 9 and that in this way the light reflected back by the object is reflected back in each instance to the assigned sensor element 3. Distance images of even flat objects can thus be recorded using the monitoring device 1, even though the receiver 2 only comprises a line of sensor elements 3 which are arranged next to one other. The anamorphotic optical system 4 and the sequential scanning of the object with the aid of the radiation pulse beams 11 thus brings about compression 13 of the object onto the line of sensor elements 3 of the receiver 2.

Figure 2:
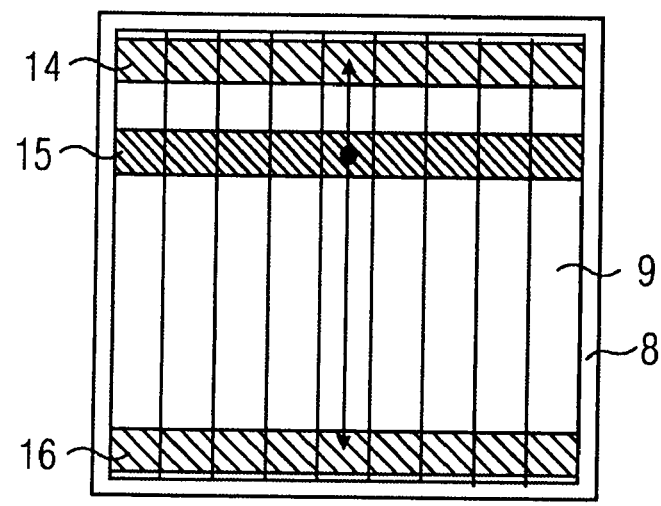
FIG. 2 shows an illustration of a field of view subjected to radiation pulse beams.

FIG. 2 shows a first possibility for scanning the field of view 8 by means of the radiation pulse beams 11. FIG. 2 shows a top view onto the field of view 8, wherein the field of view strips 9 are marked. A mirror device assigned to the transmitter 10 allows a radiation pulse beam 11 extending over all the field of view strips 9 to be moved along the field of view strips 9 across the field of view 8. By way of example, the radiation pulse beam 11 covering the field of view strips 9 can gradually be moved from beam position 14 to beam position 16. Transit time determinations are thereby carried out in each instance and the obtained distance values are used to fill an image matrix implemented in a memory line by line. After the subsequent measurement at beam position 16, the image matrix is filled and contains a complete distance image of the object to be detected. The location information to be assigned to the individual matrix elements results from the respective beam position and the location of the respective field of view strip 9.

Figure 3:
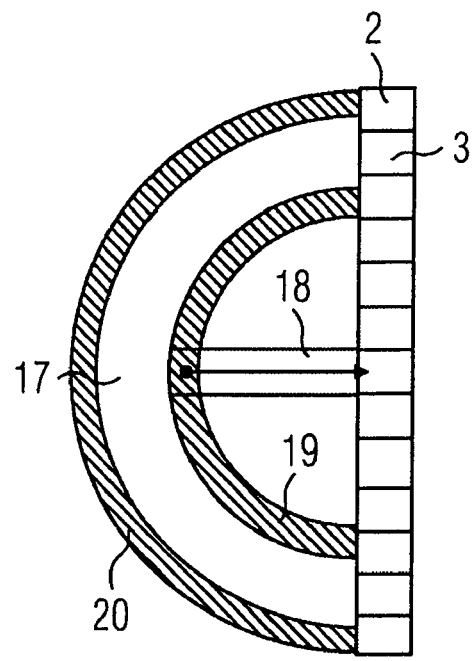
FIG. 3 shows an illustration of a further field of view subjected to radiation pulse beams.

The respective requirements for the use of the monitoring device 1 can be considered when configuring the field of view 8. FIG. 3 shows a ring-segment-shaped field of view 17 for instance, the edges of which are alternately illuminated with a radiation pulse beam 11. FIG. 3 shows both an individual field of view segment 18 and also the alternating beam positions 19, 20.

To clarify the assignment of the field of view segments 18 to the sensor elements 3, FIG. 2 also shows the sensor elements of the receiver 2 and the assignment of the marked field of view segment 18 to a sensor element 3 is shown by means of an arrow. As the beam positions 19 and 20 extend across all the field of view segments 18 without gaps, the monitoring process exhibits a high local resolution in the case illustrated in FIG. 3.

Figure 4:
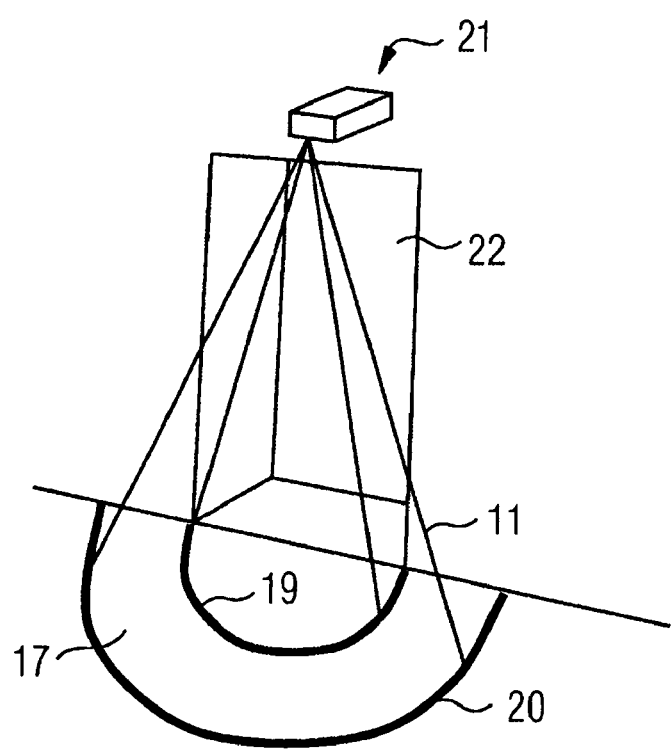
FIG. 4 shows a perspective illustration of the use of the device as a door opener.

In accordance with FIG. 4, the ring-segment-shaped field of view 17 can be used for instance with a monitoring device 21, which is used to monitor a passage 22. In this case, the monitoring device 21 is expediently positioned above the passage 22 and transmits cone-shaped radiation pulse beams 11 to beam position 19 and beam position 20.

With the aid of the monitoring device 21, it is possible not only to determine the presence of a person in the region of the passage 22, but also their direction and speed. For it is possible, with the aid of the monitoring device 21, to detect at which time point a person, who first enters into the field of view 17 in the region of beam position 19, reaches beam position 19. The speed of movement of the person can then be determined from the time difference and the known distance between beam positions 19 and 20. The monitoring device 21 is thus suited in particular to controlling automatic doors. For an evaluation of the direction and speed of the movement of persons in the field of view 17 can be used to prevent persons standing in front of the passage 22 or at a distance from the passage 22 triggering the opening of the doors sealing the passage 22.

Figure 5:
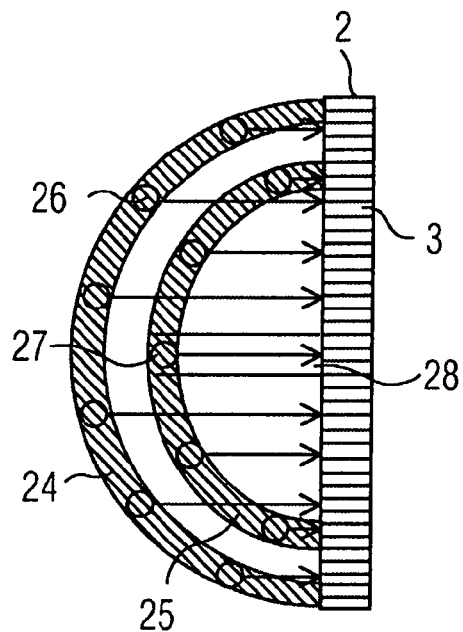
FIG. 5 shows the illustration of a further field of view, which is subjected to radiation pulse beams.

FIG. 5 shows a further field of view 23, which is designed to be ring-segment-shaped, in a similar manner to the field of view 17 in FIG. 3. Beam positions 26 and 27 are positioned on the edge of the field of view 23 in two likewise ring-segment-shaped beam zones 24 and 25, said beam positions 26, 27 being assigned in each instance to a field of view segment 28. The radiation pulse beams 11 thus do not extend, in the case illustrated in FIG. 5, over a number of field of view segments 28, but are instead distributed over the external beam zones 24 and the internal beam zone 25 such that each beam position 26 or 27 enters an individual field of view segment 28.

To clarify the assignment of beam position 26 and 27, the individual sensor elements 3 of the receiver 2 are marked in FIG. 5 and the assignment of beam position 26 and 27 to the sensor elements 3 is illustrated by way of arrows.

Figure 6:
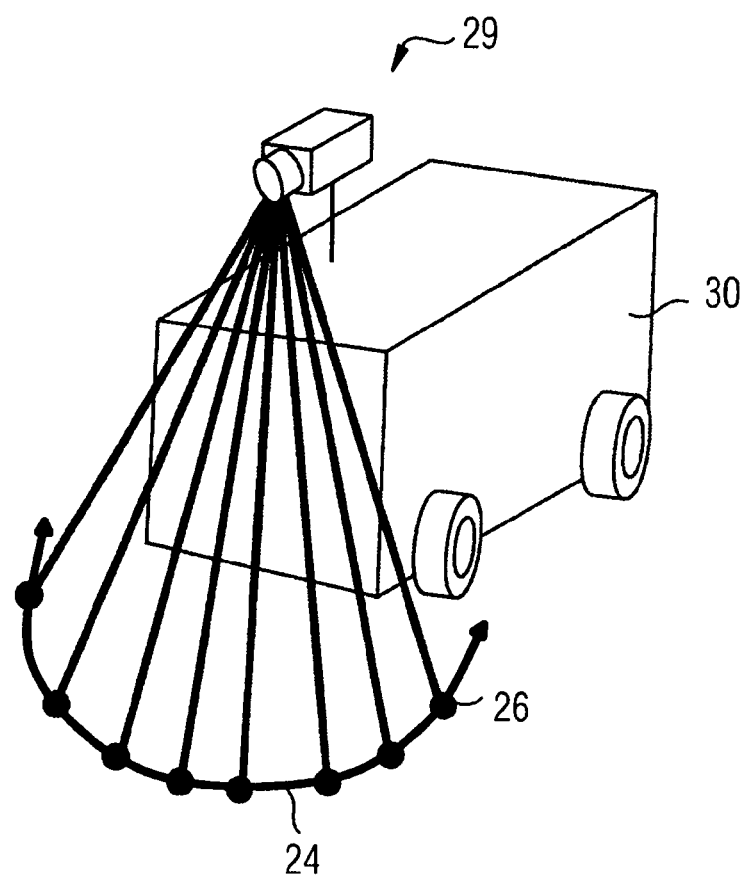
FIG. 6 shows a perspective illustration of the use of the device for collision protection systems in a driverless motor vehicle.

The configuration of the field of view 23 shown in FIG. 5 and the arrangement of the beam position 26 and 27 in the beam zones is particularly suited to the case illustrated in FIG. 6, where a monitoring device 29 is used to provide collision protection for a motor vehicle 30. The motor vehicle 30 can be a driverless transportation vehicle for instance. In the case illustrated in FIG. 6, the monitoring device 29 forms part of an optical monitoring camera.

The monitoring device 29 has a lower local resolution than the monitoring device 21 from FIG. 4 but this means that the time resolution is better, since beam positions 26 and 27 can be monitored at the same time in beam zones 24 and 25. This enables a rapid response to the appearance of obstacles in the path of the motor vehicle 30.

Figure 7:
FIG. 7 shows a side view of the use of the device for the early detection of accidents involving vehicles occupied by drivers.

FIG. 7 finally shows a further application, wherein a monitoring device 31 is integrated into a motor vehicle 32 occupied by a driver. To this end, the monitoring device 31 serves to detect imminent accidents at an early stage, herewith enabling the prompt introduction of countermeasures.

Figure 8:
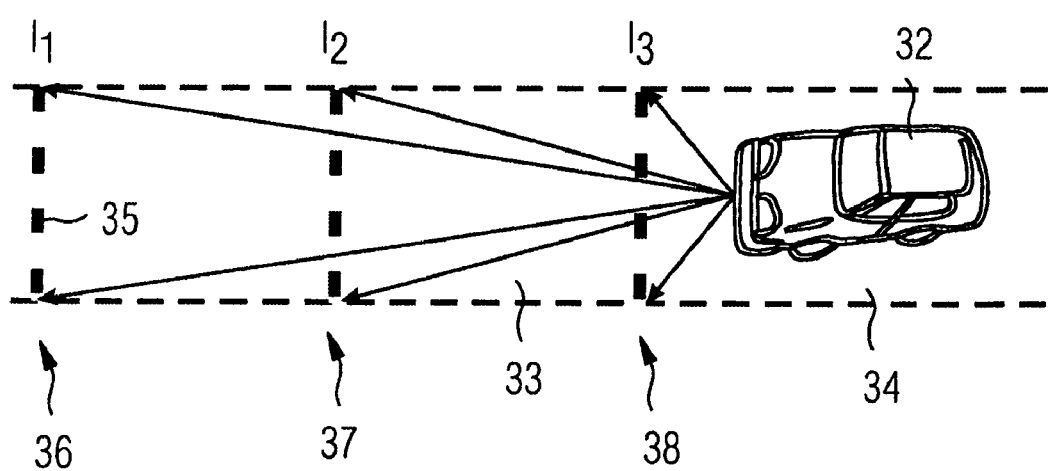
FIG. 8 shows a top view onto the field of view and the alignment of the radiation pulse beams in the case of early accident detection.

With the application illustrated in FIGS. 7 and 8, a field of view 33 extends over a path 34 of the motor vehicle 32. Radiation pulse beams 11 are sent sequentially by the monitoring device 31 to the beam positions 35, which are grouped for instance into three beam position sequences 36, 37 and 38 arranged at different distances. The intensity of the radiation pulse beam 11 herewith increases as the distance from the motor vehicle 32 increases. $I_1 > I_2 > I_3$ preferably applies if the furthest beam position sequence 36 has intensity $I_1$, the middle beam position sequence 37 has intensity $I_2$ and the closest beam position sequence 38 has intensity $I_3$.

The monitoring devices described here share the advantage that their design does not require receivers, wherein the sensor elements are arranged in a matrix shape in the manner of a flat panel detector. A line detector having an individual row of sensor elements arranged next to one another is instead sufficient to record two-dimensional distance images.

We claim:
1. A device for monitoring a space, comprising:
a transmitter emitting light with temporal intensity changes;
a receiver having one-dimensional resolution, said receiver being formed by a row of sensor elements with a multiplicity of sensor elements disposed next to one another;
an optical system, for assigning to said receiver a field of view, disposed in a radiation path in front of said receiver;
said receiver receiving radiation pulses emitted by said transmitter into the field of view;
an evaluation unit connected to said receiver and to said transmitter, said evaluation unit serving to determine a transit time of the radiation pulses;

said transmitter subjecting the field of view to radiation pulse beams and mounting a light curtain in a direction of the space to be monitored, and thus to delimit a defined spatial area;

said evaluation unit determining the transit time of the radiation pulse beams upon an entry of an object through the light curtain and into the defined spatial area, and thereby being provided information about a position of the object in the light curtain; and an anamorphotic optical system disposed to compress the field of view onto said receiver.

2. The device according to claim 1, wherein said receiver has a plurality of sensor elements and the field of view is divided into field of view segments each assigned a respective said sensor element of said receiver.

3. The device according to claim 1, wherein said transmitter is configured to sequentially illuminate the field of view with radiation beams.

4. The device according to claim 3, which comprises a mirror device for emitting the radiation pulse beams in different directions.

5. The device according to claim 1, wherein said transmitter is configured to simultaneously illuminate the field of view with different radiation pulse beams emitted in different directions.

6. The device according to claim 1, wherein said receiver comprises a line of sensors with a row of sensor elements disposed next to one another for light transit time measurement.

7. The device according to claim 6, wherein the field of view is divided into field of view strips.

8. The device according to claim 1, wherein the radiation pulse beam is a ring-segment-shaped beam.

9. The device according to claim 1, wherein an intensity of the radiation pulse beams varies from one to another.

10. The device according to claim 1, wherein light curtains, formed one behind another, are designed as object illumination.

11. The device according to claim 1, configured for a motor vehicle collision protection system.

12. The device according to claim 1, configured for early detection of accidents involving motor vehicles.

13. The device according to claim 1, configured for controlling automatic doors.

14. The device according to claim 1, configured for automatic access control.

15. In combination with a motor vehicle, the device according to claim 1.

* * * * *